United States Patent
Burns et al.

(10) Patent No.: US 11,766,818 B2
(45) Date of Patent: Sep. 26, 2023

(54) SYSTEMS AND APPROACHES FOR AUTOTUNING AN INJECTION MOLDING MACHINE

(71) Applicant: IMFLUX INC., Hamilton, OH (US)

(72) Inventors: Brian Matthew Burns, Mason, OH (US); Gene Michael Altonen, West Chester, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 18/129,311

(22) Filed: Mar. 31, 2023

(65) Prior Publication Data

US 2023/0234272 A1 Jul. 27, 2023

Related U.S. Application Data (63) Continuation of application No. 17/544,546, filed on Dec. 7, 2021, now Pat. No. 11,642,823, which is a
(Continued)

(51) Int. Cl.
*B29C 45/77* (2006.01)
*B29C 45/76* (2006.01)

(52) U.S. Cl.
CPC ............ *B29C 45/77* (2013.01); *B29C 45/766* (2013.01); *B29C 45/7693* (2013.01);
(Continued)

(58) Field of Classification Search
CPC .............. B29C 45/766; B29C 45/7693; B29C 2945/76936; B29C 2945/76939; B29C 2945/76943; B29C 2945/76949
See application file for complete search history.

(56) References Cited

U.S. PATENT DOCUMENTS 11,225,006 B2 1/2022 Burns et al.
2001/0051858 A1 12/2001 Liang et al.
(Continued)

FOREIGN PATENT DOCUMENTS

DE 19514535 A1 10/1996
JP S57116622 A 7/1982
(Continued)

OTHER PUBLICATIONS

International Application No. PCT/US2019/035528, International Search Report and Written Opinion, dated Aug. 27, 2019.
(Continued)

*Primary Examiner* — Xiao S Zhao
*Assistant Examiner* — John J DeRusso
(74) *Attorney, Agent, or Firm* — MARSHALL, GERSTEIN & BORUN LLP (57) ABSTRACT

Systems and approaches for controlling an injection molding machine and a mold forming a mold cavity and being controlled according to an injection cycle. The systems and methods include analyzing a model of at least one of the injection molding machine, the mold, and a molten material to determine initial values for one or more control parameters of the injection molding machine, and executing a run of injection cycles at the injection molding machine; measuring operation of the injection molding machine during a particular injection cycle of the run of injection cycles; determining one or more operational parameters exceed a threshold; and upon determining that the one or more operational parameters exceed the threshold, adjusting the one or more control parameters for subsequent injection cycles of the run of injection cycles.

15 Claims, 5 Drawing Sheets

Related U.S. Application Data continuation of application No. 16/432,403, filed on Jun. 5, 2019, now Pat. No. 11,225,006.

(60) Provisional application No. 62/692,265, filed on Jun. 29, 2018.

(52) U.S. Cl.
CPC ............ *B29C 2945/7605* (2013.01); *B29C 2945/7613* (2013.01); *B29C 2945/76498* (2013.01); *B29C 2945/76936* (2013.01); *B29C 2945/76943* (2013.01); *B29C 2945/76949* (2013.01); *B29C 2945/76969* (2013.01)

(56) References Cited

U.S. PATENT DOCUMENTS

| | | |
|---|---|---|
| 2002/0019674 A1 | 2/2002 | Liang et al. |
| 2007/0168079 A1 | 7/2007 | Ludwig |
| 2017/0001356 A1 | 1/2017 | Hanson, III et al. |
| 2017/0031330 A1 | 2/2017 | Shiraishi et al. |
| 2017/0168471 A1 | 6/2017 | Burns et al. |
| 2018/0178430 A1 | 6/2018 | Stoehr et al. |
| 2018/0181694 A1 | 6/2018 | Springer et al. |
| 2018/0304513 A1 | 10/2018 | Fick et al. |
| 2018/0319058 A1 | 11/2018 | Belzile et al. |
| 2020/0230857 A1 | 7/2020 | Bonada Bo et al. |
| 2022/0097273 A1 | 3/2022 | Burns et al. |

FOREIGN PATENT DOCUMENTS

| | | |
|---|---|---|
| JP | S6024915 A | 2/1985 |
| JP | H03132325 A | 6/1991 |
| JP | 201446488 A | 3/2014 |
| WO | WO-2017/083184 A1 | 5/2017 |

OTHER PUBLICATIONS

Kwak et al., Application of neural network and computer simulation to improve surface profile of injection molding optic lens, J. Materials Processing Technology, 170(1-2):24-31 (Dec. 2005).

Chinese Patent Application No. 201980043391.6, First Office Action, dated Feb. 16, 2022.

European Patent Application No. 19773283.6, Communication Pursuant to Article 94(3) EPC, dated Mar. 14, 2022.

Japanese Patent Application No. 2020-573139, Notice of Reasons for Refusal, dated Nov. 4, 2022.

FIG. 4

SYSTEMS AND APPROACHES FOR AUTOTUNING AN INJECTION MOLDING MACHINE

CROSS-REFERENCE TO RELATED APPLICATION

This non-provisional application is a continuation of U.S. application Ser. No. 17/544,546, entitled "Systems and Approaches for Autotuning an Injection Molding Machine", filed Dec. 7, 2021, which is a continuation of U.S. application Ser. No. 16/432,403, entitled "Systems and Approaches for Autotuning an Injection Molding Machine", filed Jun. 5, 2019, which claims the benefit of the filing date of U.S. Provisional Application No. 62/692,265, entitled "Systems and Approaches for Autotuning an Injection Molding Machine", filed Jun. 29, 2018, the entirety of each of which is hereby incorporated by reference.

FIELD OF THE DISCLOSURE

The present disclosure relates generally to injection molding and, more particularly, to approaches for autotuning control parameters injection molding machines in response to varying operational parameters.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat and pressure. In an injection cycle, the molten material is forcefully injected into a mold cavity having a particular desired cavity shape. The injected plastic is held under pressure in the mold cavity and is subsequently cooled and removed as a solidified part having a shape closely resembling the cavity shape of the mold. A single mold may have any number of individual cavities which can be connected to a flow channel by a gate that directs the flow of the molten resin into the cavity. A typical injection molding process generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold.

In these systems, a control system controls the injection molding process according to an injection pattern that defines a series of setpoint values for control parameters of the various components of the injection molding machine. For example, the injection cycle can be driven by a fixed and/or a variable melt pressure profile whereby the controller uses sensed pressures at a nozzle as the input for determining a driving force applied to the material.

Changes in molding conditions can significantly affect properties of the molten plastic material. As an example, material specification differences between resin batches and changes in environmental conditions (such as changes in temperature or humidity) can raise or lower the viscosity of the molten plastic material. When viscosity of the molten plastic material changes, quality of the molded part may be impacted. For example, if the viscosity of the molten plastic material increases, the molded part may be "under-packed" or less dense due to a higher required pressure, after filling, to achieve optimal part quality. Conversely, if the viscosity of the molten plastic material decreases, the molded part may experience flashing as the thinner molten plastic material is pressed into the seam of the mold cavity. Furthermore, recycled plastic material that is mixed with virgin material may impact the melt flow index (MFI) of the combined plastic material. Inconsistent mixing of the two materials may also create MFI variation between cycles.

Some conventional injection molding machines do not adjust the injection cycle to account for these changes in material properties. As a result, these injection molding machines may produce lower quality parts, which must be removed during quality-control inspections, thereby leading to operational inefficiencies. Moreover, as an injection molding run may include hundreds, if not thousands, of injection cycles, the environmental conditions of the injection molding machine may not be constant across each injection cycle of the run. Thus, even if the injection cycle is adapted to account for the environmental factors at the onset of the run, the changing environmental conditions may still result in the production of lower quality parts during injection cycles executed later in the run.

Additionally, a reliance on an injection cycle based on a fixed melt pressure pattern, the injection cycle may not be capable of properly injecting materials having varying characteristics (e.g., regrind, biodegradable, and/or renewable materials). Additionally, while some systems may use an adjustable melt pressure pattern, these systems are oftentimes incapable of maintaining material tolerances when material specifications (e.g., viscosity and part density) do change. As a result, these systems may produce inconsistently-dimensioned parts, thus further increasing operational inefficiencies.

SUMMARY

Embodiments within the scope of the present invention are directed to the control of injection molding machines to produce repeatably consistent parts by automatically retuning the control parameters of an injection molding machine based on the operation of the injection molding machine. Systems and approaches for controlling the injection molding machine include first obtaining a model of the injection molding machine, a mold, and/or a material to determine an initial set of control parameters for the injection molding machine. For example, the control parameters may include a melt pressure profile and/or gain values for a proportional-integral-derivative (PID) controller. Operation of the injection molding machine is measured during the injection cycle. When operation is outside of an expected range of operation, the control parameters are automatically tuned (e.g., adjusted based upon current operation of the injection molding machine).

As compared to conventional, fixed control of an injection molding process across the various injection cycles of a run of injection cycles, automatically tuning the control parameters can reduce the number of oscillations that occur and/or reduce the magnitude of the oscillations that do occur. Reducing the oscillations improves how closely the performance of the injection molding machines matches the setpoints defined by the injection cycle. Automatically tuning the control parameters also causes the injection molding machine to achieve steady state values that more closely match those defined by the injection cycle. As a result, the consistency at which the injection molding machines produces molded parts is improved.

In various embodiments, a controller of the injection molding machine may be operatively connected to one or more sensors that monitor the operating conditions of the injection molding machine. For example, one sensor may monitor a screw position; another sensor may monitor a velocity at which the screw rotates; still another sensor may monitor a mold cavity pressure; and yet another sensor may monitor a temperature of a thermoplastic material or of a heated barrel. The controller can obtain the sensor data generated by the one or more sensors to determine whether or not the operation of the injection molding machine is within the expected range of operation.

In some embodiments, the controller compares a single parameter to a threshold value. For example, an overshoot pressure may exceed a threshold amount, an error in steady-state pressure may exceed a threshold amount, or a humidity in the injection molding machine's ambient environment may have shifted beyond a threshold amount. In additional or alternative embodiments, the controller may combine the sensor data to generate a composite metric or score that is compared to a threshold value. For example, the sensor data may be combined to determine a metric indicative of the viscosity of the molten material. In some embodiments, one or more of the characteristics of the injection molding machine, mold, and/or the molten material indicated by their respective models are also used to determine the composite metric.

In some embodiments, one or more machine learning techniques are applied to determine the composite metric and/or the threshold value to which the composite value is compared. For example, in some implementations, performance of a plurality of injection cycles is monitored for a plurality of different injection molding machines, molds, and molten materials. Accordingly, this historical data can be used as an input to train the machine learning algorithm to correlate the characteristics of the injection molding machine, mold, and/or molten material compiled in their respective models and their impact on the measured response to being controlled in accordance with the injection cycle.

Therefore, the controller may determine the need to adjust the control parameters of the injection molding process with more accuracy than conventionally possible. Moreover, when compared to conventional injection molding systems that rely on manual monitoring of the injection molding machine, the present techniques enable the determination of the need to adjust the control parameters based on relationships beyond those capable of manual observation.

Further, different injection molding machines, molds, and/or thermoplastic materials may exhibit different performance characteristics when following the same injection pattern. For example, some injection molding machines may be used more frequently than other injection molding machines. Accordingly, moving parts in the injection molding machine may exhibit higher or lower resistivity depending on the particular effects caused by wear and tear. As another example, different injection molding machines may be manufactured by different companies using different processes. These differences may be quantified and represented by the model of the injection molding machine.

In some embodiments, the mold may also be modeled. The model of the mold may include data associated with historic injection cycles executed by injection molding machines. For example, the data may include an identifier of the injection molding machine that executed the mold cycle, a plurality of injection pressure or injection velocity values sensed over the course of the mold cycle, or other characteristics of injection molding machine when executing the mold cycle.

In some further embodiments, the molten material may also be modeled. The model of the molten material may include a MFI associated with the material and/or a correlation between molten material MFI and the ratio of regrind to unused molten material.

In various embodiments, the controller is also operatively connected to a model database that stores the models representative of injection molding machines, molds, and/or molten materials. The controller can obtain the models corresponding to the relevant injection molding machine, mold, and/or molten material. In addition to the sensor data obtained from the one or more sensors, the controller can analyze the model of the injection molding machine when automatically determining the tuning adjustments to one or more control parameters.

Analyzing the models of the injection molding machine, mold, and/or molten material to determine a composite score and/or to adjust the control parameters further reduces the error between the setpoint pattern and the exhibited response by tailoring control to the specific operating equipment. Consequently, the consistency of the molded product is increased, thereby enabling the production of molded products that can achieve tighter tolerances than achievable using conventional techniques.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale. For example, the dimensions and/or relative positioning of some of the elements in the figures may be exaggerated relative to other elements to help to improve understanding of various embodiments of the present invention.

DETAILED DESCRIPTION

Figure 1A:
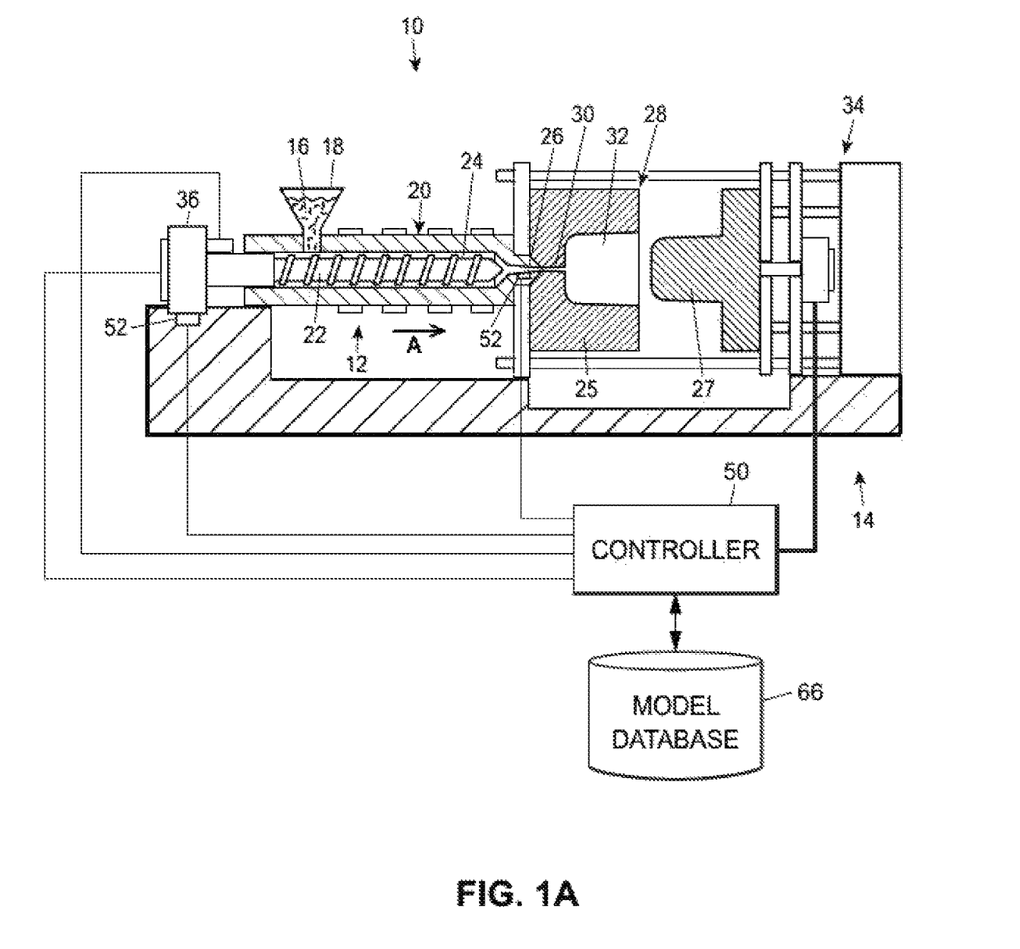
FIG. 1A illustrates a schematic view of an example injection molding machine having a controller coupled thereto in accordance with various embodiments of the present disclosure.

Referring to the figures in detail, FIG. 1A illustrates an exemplary injection molding machine 10 for producing thermoplastic parts in high volumes (e.g., a class 101 or 30 injection mold, or an "ultra-high productivity mold"), especially, but not necessarily, thinwalled parts having an L/T ratio of 100 or greater. The injection molding machine 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24 toward a nozzle 26 to form a shot of thermoplastic material, which will be injected into a mold cavity 32 of a mold 28 via one or more gates. The molten thermoplastic material 24 may be injected through a gate 30, which directs the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected to the injection molding machine 10 and is configured to execute a set of computer-readable instructions stored in a non-transitory memory to cause the injection molding machine 10 to execute injection cycles (i.e., the above-described injection molding process). To execute an injection cycle, the controller 50 may implement an injection pattern that includes one or more setpoint values for the control parameters that form an injection pattern. In some embodiments, the injection pattern defines a substantially constant pressure profile. Of course, the injection pattern may define other pressure profiles (e.g., a conventional, high pressure injection molding process).

The controller 50 is also communicatively coupled to one or more sensors 52, such as the illustrated nozzle sensor, to measure operation of the injection molding machine 10. Although FIG. 1A only depicts a nozzle sensor and a screw position sensor, it should be appreciated that the controller 50 may monitor the data generated by any number of sensors 52. In various embodiments, the sensors 52 may include any number of temperature sensors, pressure sensors, velocity sensors, and/or position sensors configured to monitor operation of the injection molding machine 10. Additionally, the sensors 52 may include sensors that monitor the environment surrounding the injection molding machine 10. For example, the sensors 52 may include a humidity sensor, a temperature sensor, an altitude sensor, a barometer, and/or a seismometer.

According to disclosed embodiments, the controller 50 is also operatively connected to a model database 66 that stores models indicative of characteristics of the injection molding machine 10, the mold 28, and/or the molten thermoplastic material 24 (or, in some embodiments, the thermoplastic pellets 16 in the hopper 18). For example, the model of the injection molding machine 10 may indicate a resistivity of one or more components of the injection molding machine 10, a number of injection cycles executed using the injection molding machine 10, a known error for one or more process variables introduced by the injection molding machine 10, a purge pot pressure of the injection molding machine 10, and/or a dead head pressure of the injection molding machine 10. As another example, the model of the mold 28 may indicate a resistivity of the mold walls of the mold 28, a number of injection cycles executed using the mold 28, and/or a material from which the mold 28 is made. As still another example, the model of the molten thermoplastic material 24 may indicate a MFI and/or factor indicative of how MFI changes based on the amount of regrind introduced into the hopper 18. Although FIG. 1A depicts the model database 66 as a single entity, in some embodiments, the model database 66 may be divided into or made redundant using any number of database entities. The data populating the model database 66 may be stored on a non-transitory computer readable data storage medium, such as a read/write data storage medium that is associated with one or more components of the injection molding machine 10, the mold 28, and/or a storage container or bag containing thermoplastic pellets 16 of the thermoplastic material 24.

Prior to executing a run of injection cycles, the controller 50 may obtain and analyze the model for the injection molding machine 10, the mold 28, and/or the molten thermoplastic material 24 to set an initial value for one or more control parameters of the injection molding machine. For example, the control parameters may be associated with component setpoint patterns that define a series of setpoint values for a particular control parameter over the course an injection cycle (such as melt pressure, injection velocity, hold pressure exerted by the clamping unit 34, and/or position of the screw 22). The control parameters may also include parameters that are substantially constant throughout the injection cycle (such as temperature of the heated barrel 20). Additionally or alternatively, the controller 50 may analyze any environmental sensors 52 to set the initial values for the one or more control parameters.

In some embodiments, the controller 50 determines the initial values by inputting the model data and/or the sensor data into a machine learning model. In these embodiments, the machine learning model may be trained on historical data of prior injection cycles executed using the same or other injection molding machines, molds, and/or material. Based on the trained relationships between the model data and/or the sensor data, the machine learning model may generate a set of initial values that minimizes the error between the expected operation of the injection molding machine 10 and the injection pattern indicated by the injection cycle and/or produces more consistent molded parts.

Figure 1B:
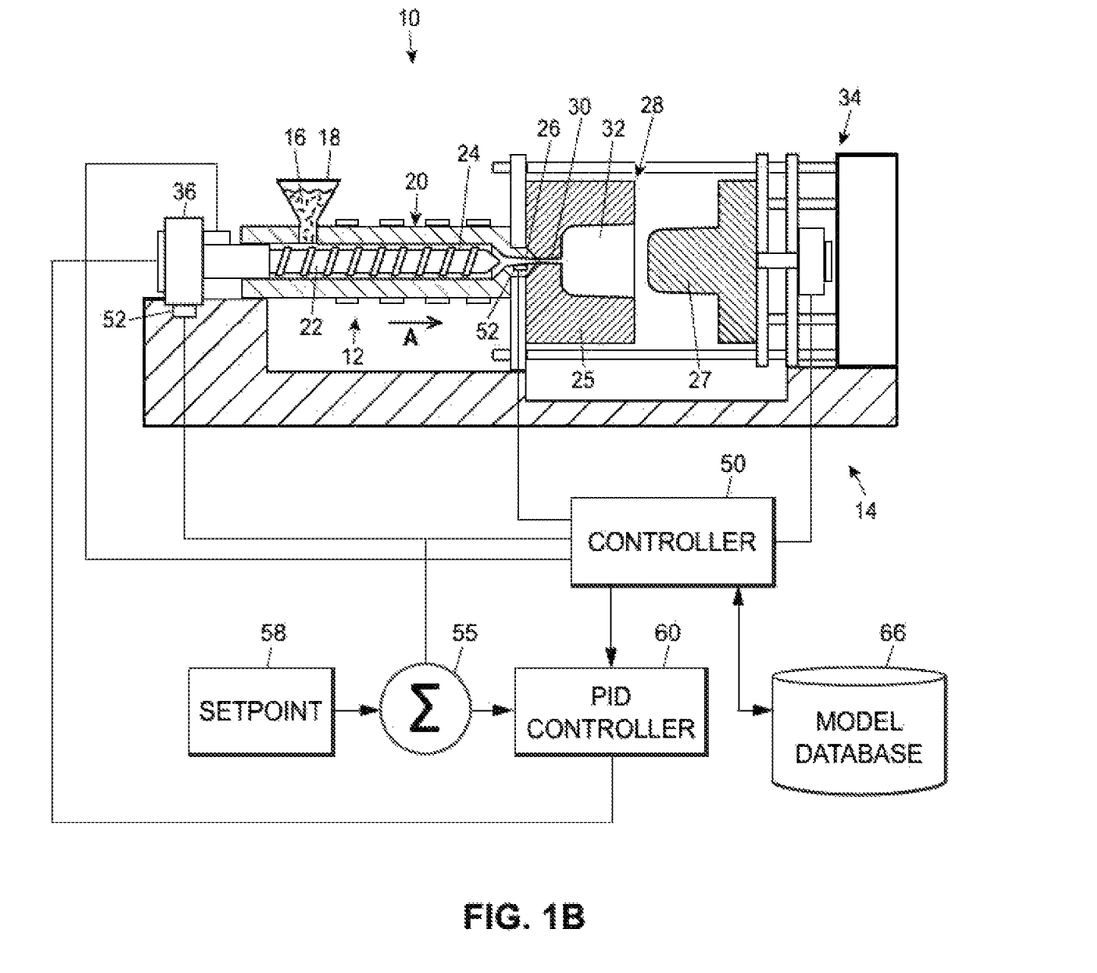
FIG. 1B illustrates a schematic view of an example injection molding machine having a controller and a PID controller coupled thereto in accordance with various embodiments of the present disclosure.

In the embodiment illustrated in FIG. 1B, the controller 50 is also operatively connected to a proportional-integral-derivative (PID) controller 60. In these embodiments, the PID controller 60 is configured to control a particular control parameter of the injection molding process. In operation, the PID controller 60 compares one or more setpoint values 58 (such as the target setpoint values included in an injection pattern) for the control parameter to the measured value of the control parameter via an adder or comparator 55. For example, the PID controller 60 may be configured to control injection pressure or an injection velocity. Accordingly, one of the sensors 52 may be configured to monitor the injection pressure or injection velocity. In some embodiments, the sensor data is communicated directly to the comparator 55. In other embodiments, the sensor data is communicated to the controller 50 and/or the PID controller 60 which routes the sensor data to the comparator 55.

After the controller 50 determines the initial values of the control parameters for the injection molding process, the controller 50 executes a run of injection cycles (i.e., a series of sequentially executed injection cycles using the injection molding machine 10). As described herein, over the course of the run, operation of the injection molding machine 10 shifts. For example, the viscosity of the molten material 24 may shift, the temperature of the environment may shift, or trace amounts of the molten material 24 may be deposited on the mold 28. As a result, the initial values may no longer be optimal for operating the injection molding machine 10 via the initial injection pattern. Accordingly, after each injection cycle of the run, the controller 50 may be configured to analyze the operational parameters of the prior injection cycle to automatically determine whether or not the control parameters for the injection molding process should be adjusted (e.g., "auto-tuned").

Figure 2A:
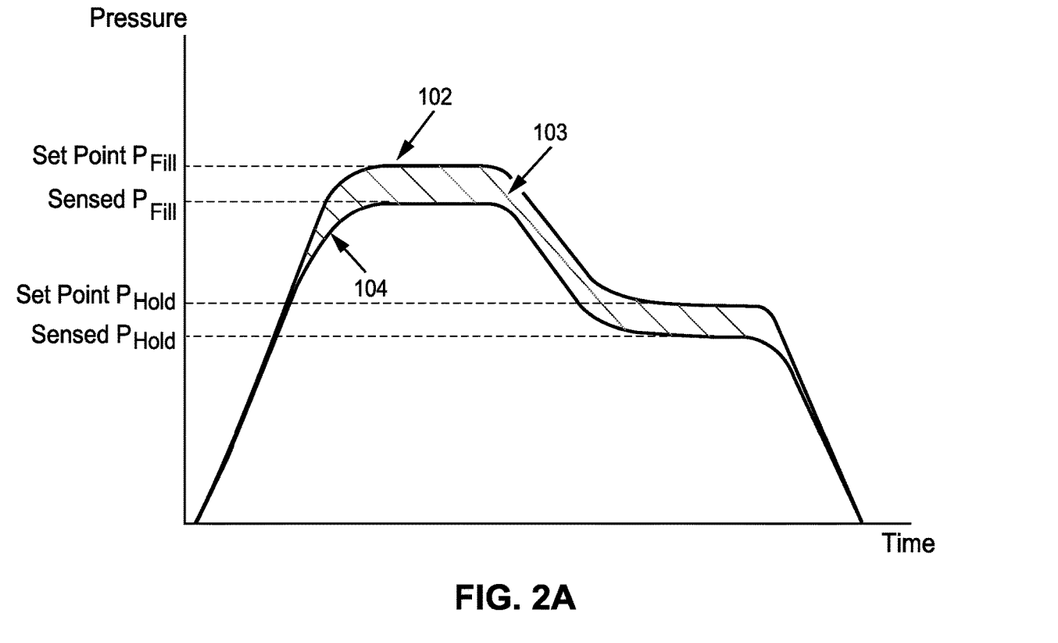
FIG. 2A illustrates a comparison plot between setpoint pressure values and sensed pressure values for an injection cycle executed by the injection molding machine constructed according to the disclosure.

With reference to FIG. 2A, illustrated is a comparison plot between setpoint melt pressure values 102 (e.g., melt pressure control parameters) and the sensed melt pressure values 104 (e.g., measured operational parameters) for an injection cycle executed by the injection molding machine 10. It should be appreciated that while the illustrated plot is based on a substantially constant pressure profile, the disclosed techniques may be applied to any suitable pressure profile. In embodiments that implement the substantially constant pressure profile, the sensed melt pressure values 104 may be generated by a nozzle sensor of the sensors 52 and communicated to the controller 50 during the execution of the injection cycle. During an initial phase of the injection cycle, pressure rapidly increases to a setpoint value (setpoint $P_{Fill}$). In the fill phase, the pressure is held at the steady-state pressure value as the mold cavity 32 is filled. When molten material 24 nears the end of the mold cavity 32, pressure is reduced to second, lower, setpoint value (setpoint $P_{Hold}$). In the pack and hold phase, the pressure is held at the steady-state pressure value as the molten material 24 in the mold cavity 32 cools. After the material 24 is cooled, the mold 28 is opened in the molded part is ejected from the mold cavity 32.

However, as illustrated, the sensed melt pressure values 104 do not match the setpoint pressure values 102. Accordingly, in some embodiments, the controller 50 is configured to analyze these differences to determine the need to adjust the control parameters. For example, the controller 50 may determine a metric indicative of the difference between the setpoint $P_{Fill}$ and the measured $P_{Fill}$ or the difference between the setpoint $P_{Hold}$ and the measured $P_{Hold}$. As another example, the controller 50 may determine a metric indicative of the total amount of error 103 between the setpoint pressure values 102 and the sensed pressure values 104.

Figure 2B:
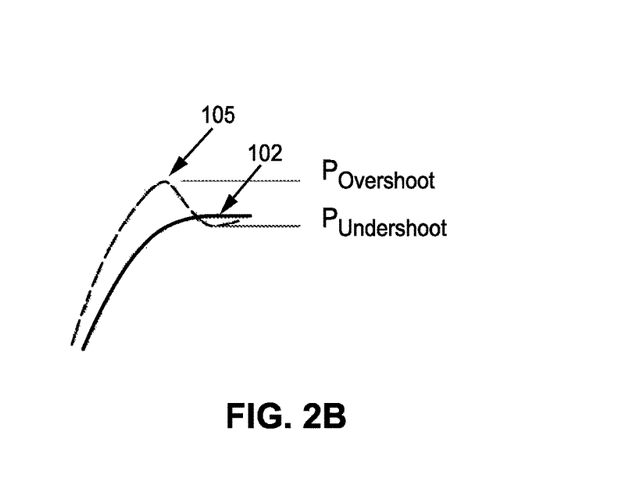
FIG. 2B illustrates particular aspects of the comparison plot of FIG. 2A.

According to aspects of this disclosure, when the injection molding machine 10 exhibits a step response (such as the one indicated by the setpoint values 102), the sensed pressure values 104 do not immediately reach the steady-state value 102. Instead, as illustrated in FIG. 2B, the response overshoots the steady-state value 102 and exhibits decreasing oscillatory error until achieving the steady-state value. Accordingly, while FIG. 2A illustrates the sensed pressure curve 104 without the overshoot, the sensed pressure curve may actually exhibit the oscillatory error indicated by the pressure curve 105 as shown in FIG. 2B. The difference between the overshoot pressure associated with the step response of the pressure curve 105 and the setpoint 102 is referred to as the "$P_{Overshoot}$." Similarly, when the controller 50 compensates for the overshoot pressure, the pressure curve 105 exceeds the setpoint value 102 again. The difference between the amount the pressure curve 105 exceeds the setpoint 102 is referred to as the "$P_{Undershoot}$." Accordingly, in some embodiments, the controller may be configured to determine a metric based on the $P_{Overshoot}$ or $P_{Undershoot}$ values to determine the need to adjust the control parameters.

It should be appreciated that FIGS. 2A and 2B only illustrate some example operational parameters that may be analyzed by the controller 50 to determine the need to adjust the control parameters. In various embodiments, the controller 50 may analyze other operational parameters (such as injection velocity, screw position, clamping pressure, etc.) to determine the need to adjust the control parameters.

Figure 3:
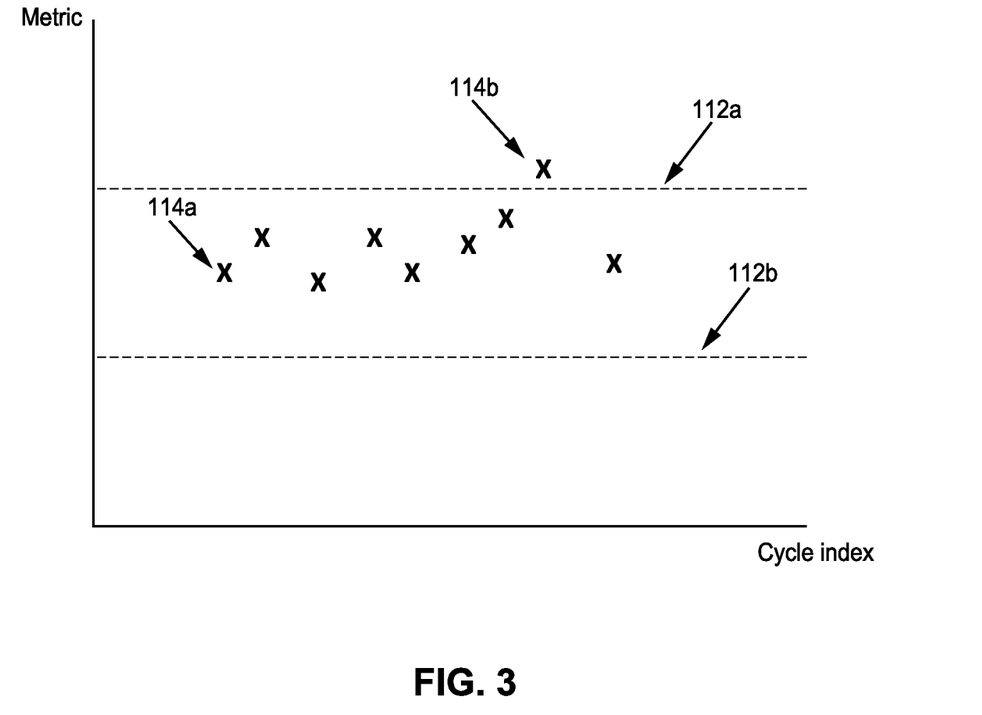
FIG. 3 illustrates a comparison plot of a operation parameter metric and an injection cycle index of a run of injection cycles.

Regardless of the particular operational parameter, the controller 50 may compare the value for the operational parameter to a threshold to determine the need to adjust the control parameters. Referring to FIG. 3, illustrated is a comparison plot of an operational parameter metric and an injection cycle index of a run of injection cycles. The operational parameter metric values 114 (illustrated as "X"s) represent the value of the operational parameter during each injection cycle of the run. The controller 50 has defined an expected range of operation that includes an upper bound threshold 112a and a lower bound threshold 112b. Accordingly, the controller 50 may detect when the value of the metric exceeds the threshold 112a (as illustrated by the value 114b). In response, the controller 50 autotunes the control parameters. As a result, as illustrated, the next value 114 is within the thresholds 112a and 112b.

It should be appreciated that term "exceeds a threshold" does not necessarily refer to the operational parameter exceeding an upper bound of expected operation, such as the threshold 112a. In other scenarios, the controller 50 may determine the need to adjust the control parameters based on the metric exceeding the lower bound threshold 112b.

Figure 4:
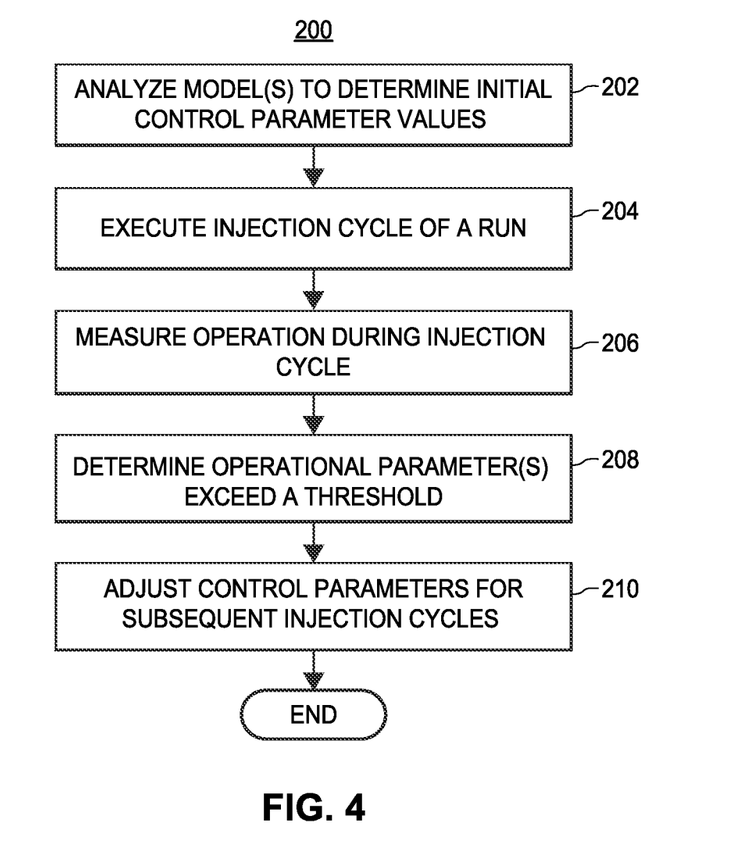
FIG. 4 illustrates an exemplary method for autotuning control parameters of an injection molding process.

FIG. 4 illustrates an exemplary method 200 for autotuning control parameters of an injection molding process. The method 200 may be performed by a controller 50 operatively connected to the injection molding machine 10 of FIG. 1A or 1B.

The example method 200 begins by the controller 50 analyzing a model of at least one of the injection molding 10, the mold 28, and a molten material 24 to determine initial values for one or more control parameters of the injection molding machine 10 (block 202). As described above, the controller 50 may obtain the models from the model database 66. In addition to any data included in the models, the controller 50 may analyze data generated by the sensors 52, including sensors configured to sense environmental conditions associated with the injection molding machine 10. In some embodiments, the controller 50 utilizes the model data (and any sensor data) as an input into a machine learning algorithm that generates the initial values for the one or more control parameters.

At block 204, the controller 50 executes a run of injection cycles at the injection molding machine 10. During each injection cycle of the run, the injection molding machine 10 injects the molten material 24 into a cavity 32 of the mold 28 according to an injection pattern. The injection pattern may define one or more setpoint patterns for one or more control parameters. For example, the injection pattern may define a setpoint pattern for melt pressure, screw position, screw velocity, hold or clamp pressure, and so on.

At block 206, the controller 50 measures operation of the injection molding machine 10 during a particular injection cycle of the run of injection cycles. In some embodiments, the controller 50 measures operation of the injection molding machine 50 after the controller 50 finishes controlling the injection molding machine 10 to execute the particular injection cycle. To measure the operation of the injection molding machine 10, the controller 50 may obtain data sensed by the sensors 52 configured to monitor various conditions of the injection molding process.

At block 208, the controller 50 determines that one or more operational parameters exceeds a threshold. The operational parameters may include a steady-state error, an overshoot pressure, an undershoot pressure, an environmental parameter, and so on. Accordingly, the controller 50 may compare a value for a particular operational parameter to the threshold. In some embodiments, the threshold may be indicative of a viscosity of the molten material 24 and/or a molded part weight (which can be used as an indication of part-to-part consistency) being outside of an expected range of operation.

Additionally or alternatively, the controller 50 may combine two or more of the operational parameters to generate a composite metric. In some embodiments, the controller 50 assigns the individual operational parameters a weight or weighting function to combine the operational parameters into the composite metric. For example, the weights or weighting functions may be indicative of the amount the particular operational parameter impacts the viscosity of the molten material 24 and/or the molded part weight. Accordingly, in these embodiments, the controller 50 compares the composite metric to the threshold.

In some embodiments, the controller 50 applies a machine learning algorithm to determine the composite metric. More particularly, the controller 50 may apply machine learning techniques to determine the weights and/or weighting functions for the operational parameters combined into the composite metric. In some embodiments, the machine learning model that determines the weights used to develop the composite metric may be a different machine learning model than the model used to determine the initial control values. In these embodiments, while both machine learning models may be trained based on data collected during prior injection cycles executed using the same or different injection molding machines, molds, and/or molten materials, the machine learning model that determines the weights associated with the operational parameters may be configured to determine a need to autotune the control parameters, but not necessarily the particular values to which the control parameters are tuned. In other embodiments, the same machine learning model determines both the weights or weighting function to combine the operational parameters to generate the composite metric, as well as the values to which the control parameters are tuned.

At block 210, upon determining that the one or more operational parameters exceeds the threshold, the controller 50 adjusts the control parameters for subsequent injection cycles of the run of injection cycles. In some embodiments, the controller 50 adjusts one or more setpoint patterns for the control parameters that form the injection pattern. In embodiments that include the PID controller 60 being operatively connected to the injection molding machine 10 as illustrated in FIG. 1B, the controller 50 may adjust one or more of the gains of the PID controller 60. To this end, the PID controller 60 may include one or more interfaces to receive commands to configure the proportional, integral, and/or derivative gains. The interfaces may include application-layer interfaces, such as an application programming interface (API), and a communication interface, such as a wired or wireless communication link. The controller 50 may generate a command to adjust the proportional, integral, and/or derivative gains in a format defined by the API of the PID controller 60 and transmit the command to the PID controller 60 via the wired or wireless communication link.

In some embodiments, the controller 50 applies a machine learning algorithm to determine an adjustment to the control parameters. For example, the controller 50 may utilize the machine learning algorithm used to generate the initial values for the control parameters to determine the adjustment. As described above, the environment and/or the operation of the injection molding machine 10 changes throughout the course of a run. Accordingly, when the controller 50 utilizes the updated set of operational data as an input, the machine learning algorithm may produce a different set of control parameter values. The controller 50 may analyze this output set of control parameters values to determine the adjustment to the one or more control parameters. As a result, when the controller 50 controls the injection molding machine 10 to execute subsequent injection cycles, the consistency in molded parts is improved.

It should be appreciated that a run may include a sufficient number of injection cycles that the operational parameters may continue to shift, thereby causing the operation of the injection molding machine 10 to be outside of the expected range of operation. Accordingly, the controller 50 may be configured to execute the actions associated with blocks 206-210 after each subsequent injection cycle of the run.

It should be understood that the term "control parameter" generally refers to an input into the injection molding process controlled by a controller and the term "operational parameter" generally refers to measured characteristic of the injection molding process during operation. In some embodiments, the same characteristic of the injection molding process may be both a control parameter and an operational parameter. For example, a melt pressure may be associated with a control parameter (e.g., a setpoint value or injection pattern) and an operational parameter (e.g., a sensed pressure value via a physical or virtual sensor).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An injection molding system comprising:
   an injection molding machine;
   a mold;
   a model database configured to store models for (i) the injection molding machine and (ii) the mold; and
   a controller operatively connected to the model database and to the injection molding machine, the controller configured to:
     analyze the model of at least the mold, wherein the model of the mold includes data indicating a resistivity of the mold walls of the mold and/or a material from which the mold is made;
     determine initial values for one or more control parameters of the injection molding machine based at least upon the mold data associated with the resistivity of the mold walls of the mold and/or the material from which the mold is made;
     execute a run of injection cycles at the injection molding machine, wherein during each injection cycle of the run, the injection molding machine injects a molten material into a cavity of the mold according to an injection pattern;
     measure operation of the injection molding machine during a particular injection cycle of the run of injection cycles;
     determine one or more operational parameters exceed a threshold; and
     upon determining that the one or more operational parameters exceed the threshold, adjust the one or more control parameters for subsequent injection cycles of the run of injection cycles.

2. The system of claim 1, further comprising:
   a proportional-integral-derivative (PID) controller configured to control a control parameter of the one or more control parameters, the PID controller having (i) a first gain associated with a proportional component; (ii) a second gain associated with an integral component; and (iii) a third gain associated with a derivative component.

3. The system of claim 2, wherein to adjust the one or more control parameters, the controller is configured to:
   adjust one of the first, second, or third gains of the PID controller.

4. The system of claim 1, wherein the injection pattern defines one or more setpoint patterns for the one or more control parameters.

5. The system of claim 4, wherein to adjust the one or more control parameters, the controller is configured to:
   adjust a setpoint pattern for the one or more setpoint patterns.

6. The system of claim 1, wherein the model database includes a model of the molten material.

7. The system of claim 6, wherein to determine the initial values for the one or more control parameters, the controller is configured to:
   analyze the model of the molten material.

8. The system of claim 1, wherein the one or more operational parameters include two or more operational parameters, and wherein to determine the one or more operational parameters exceed the threshold, the controller is configured to:
   combine a value for two or more of the operational parameters to generate a composite metric.

9. A method for controlling an injection molding machine and a mold forming a mold cavity, the injection molding machine being controlled according to an injection cycle, the method comprising:
   analyzing a model of at least the mold, wherein the model of the mold includes data indicating resistivity of the mold walls of the mold and/or a material from which the mold is made;
   determining initial values for one or more control parameters of the injection molding machine based at least upon the mold data indicating the resistivity of the mold walls of the mold and/or the material from which the mold is made;
   executing a run of injection cycles at the injection molding machine, wherein during each injection cycle of the run, the injection molding machine injects a molten material into the mold cavity according to an injection pattern;
   measuring operation of the injection molding machine during a particular injection cycle of the run of injection cycles;
   determining one or more operational parameters exceed a threshold; and
   upon determining that the one or more operational parameters exceed the threshold, adjusting the one or more control parameters for subsequent injection cycles of the run of injection cycles.

10. The method of claim 9, wherein the one or more operational parameters include one or more of a steady-state error, an overshoot pressure, an undershoot pressure, and an environmental parameter.

11. The method of claim 9, wherein:
    the injection pattern defines one or more setpoint patterns for the one or more control parameters; and
    adjusting the one or more control parameters includes adjusting the one or more setpoint patterns included in the injection pattern.

12. The method of claim 9, wherein the control parameters include (i) a first gain associated with a proportional component of a proportional-integral-derivative (PID) controller; (ii) a second gain associated with an integral component of the PID controller; and (iii) a third gain associated with a derivative component of the PID controller.

13. The method of claim 12, adjusting the one or more control parameters comprises:
    adjusting one of the first, second, or third gains of the PID controller.

14. The method of claim 9, wherein determining the initial values for the one or more control parameters comprises:
    analyzing a model of the molten material to determine the initial values.

15. The method of claim 9, wherein:
the one or more operational parameters include two or more operational parameters, and
determining the one or more operational parameters exceed the threshold comprises:
combining a value for two or more of the operational parameters to generate a composite metric.

\* \* \* \* \*